United States Patent [19]

Engeler et al.

[11] Patent Number: 5,467,185
[45] Date of Patent: Nov. 14, 1995

[54] EMISSIONS CONTROL FOR INTERNAL COMBUSTION ENGINE

[75] Inventors: William E. Engeler, Scotia; Dale M. Brown, Schenectady, both of N.Y.

[73] Assignee: General Electric Company, Schenectady, N.Y.

[21] Appl. No.: 276,123

[22] Filed: Jul. 15, 1994

[51] Int. Cl.⁶ .......................... G01M 15/00; F02D 41/14; F02P 5/145
[52] U.S. Cl. .................. 356/44; 73/116; 123/425
[58] Field of Search ................ 123/435; 73/116; 356/44, 45

[56] References Cited

U.S. PATENT DOCUMENTS

| | | | |
|---|---|---|---|
| 4,887,574 | 12/1989 | Kuroiwa et al. | 73/116 |
| 4,919,099 | 4/1990 | Extance et al. | 73/116 |
| 5,186,146 | 2/1993 | Sohma et al. | 123/435 |
| 5,257,496 | 11/1993 | Brown et al. | |
| 5,303,684 | 4/1994 | Brown et al. | |

*Primary Examiner*—Richard A. Rosenberger
*Attorney, Agent, or Firm*—Ann M. Kratz; Marvin Snyder

[57] ABSTRACT

Respective SiC (silicon carbide) photodiode sensors are used to measure flame temperature at each cylinder of an internal combustion engine, and information generated by the SiC photodiode sensors is used to control the fuel injection in a feedback loop to control individual cylinder flame temperature and combustion.

26 Claims, 3 Drawing Sheets

EMISSIONS CONTROL FOR INTERNAL COMBUSTION ENGINE

BACKGROUND OF THE INVENTION

1. Field of the Invention

This invention relates to a system for controlling emissions in an internal combustion engine and, more particularly, to use of a silicon carbide sensor to measure flame temperature at each cylinder of an internal combustion engine for controlling fuel injection.

2. Description of the Related Art

Silicon carbide (SIC) is a crystalline substance that can withstand very high temperatures. For example, semiconductor devices manufactured of SiC can withstand temperatures in excess of 300° C. Thus, SiC semiconductors are desirable for applications that require exposure to high temperatures.

SiC electronics technology can be viewed as a means of controlling flame temperature by reducing fuel-to-air ratios in high temperature environments, such as encountered in the internal combustion of an automobile, which reduces the production of nitrogen oxide ($NO_x$) emissions. When the operating temperature is excessively high, $NO_x$ emissions, which are classified as pollutants, are also excessively high. However, when fuel is burned lean to hold down the flame temperature, the flame can produce too much carbon monoxide (CO) and become unstable or even be extinguished with resulting exhaust contamination of unburned fuel. The design constraints for these combustion engines have become so exacting that the manufacturing tolerances are difficult to achieve.

In conventional internal combustion engines, the fuel-to-air ratio is controlled in an open loop manner by sensing the total air input. Combustion occurs, however, in each of the cylinders. Conventional internal combustion engines are therefore subject to errors caused by an imbalance of the fuel-to-air ratios in different cylinders even when the total air input value is within the correct range.

SUMMARY OF THE INVENTION

Accordingly, one object of the present invention is to provide an emissions control for an internal combustion engine that is capable of controlling individual cylinder flame temperature and combustion.

Briefly, in accordance with a preferred embodiment of the invention, respective SiC photodiode sensors are used to measure flame temperature at each cylinder of an internal combustion engine, and information generated by the SiC photodiode sensors is used to control the fuel injection in a feedback loop to control individual cylinder flame temperature and combustion.

In accordance with another preferred embodiment of the invention, an apparatus for controlling emissions in an internal combustion engine having a plurality of cylinders comprises a plurality of high temperature optical sensors, each of the optical sensors being adapted to sense optical flame intensity from a respective cylinder and convert the sensed optical flame intensity to an analog signal, and a plurality of signal converters for conditioning the analog signals of respective ones of the optical sensors for use in an engine fuel injection controller.

In accordance with another preferred embodiment of the invention, an apparatus for controlling emissions in an internal combustion engine having a plurality of cylinders comprises a plurality of silicon carbide photodiode sensors. Each of the photodiode sensors is positioned in the area of a respective one of the cylinders for converting optical flame intensity levels in the respective cylinder to analog signals. A plurality of signal converters are provided with each signal converter comprising a feedback loop for converting the analog signals of a respective one of the plurality of photodiode sensors to digital pulse signals. A controller sends fuel mixture control signals to the fuel-to-air control valve of each cylinder of the internal combustion engine in response to the digital pulse signals of the plurality of signal converters. In one embodiment of this preferred embodiment, each signal converter comprises means for integrating a respective analog signal during a combustion cycle, means for sampling the integrated analog signal and holding the sampled signal value, means for changing the value of the sampled signal into a series of digital pulses, and means for transmitting the pulses to the controller.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
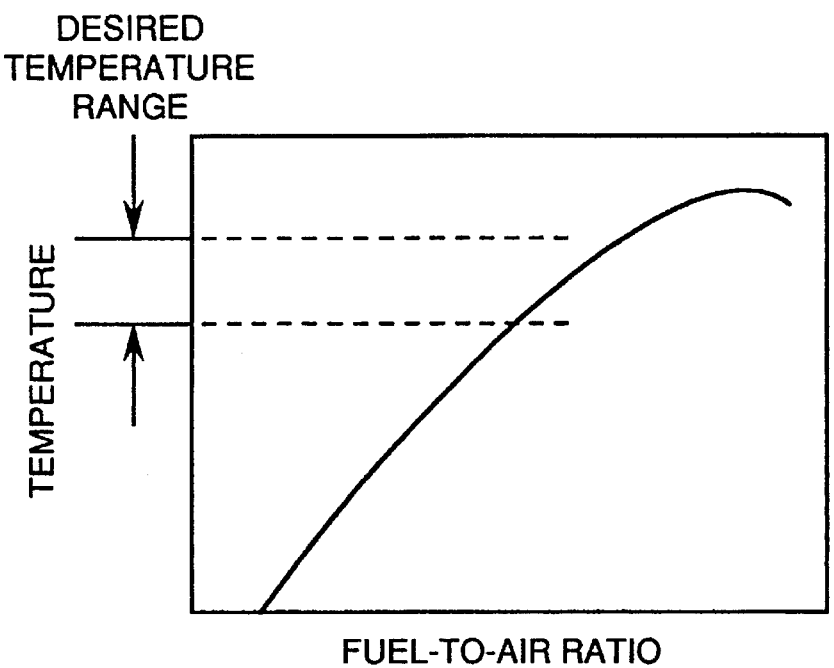
FIG. 1 is a graph illustrating combustion flame temperature of an internal combustion engine, plotted as a function of fuel-to-air ratio.

FIG. 1 is a graph illustrating the expected combustion flame temperature of an internal combustion engine, plotted as a function of fuel-to-air ratio. The term "internal combustion engine" is meant to include combustion engines having a plurality of internal cylinders, such as, for example, automobile engines, locomotive engines, and diesel engines. At very lean fuel-to-air ratios, the flame temperature in a respective cylinder of an internal combustion engine is low. The temperature increases as the fuel-to-air ratio increases. The peak of the curve is not reached until after the intended operating range is reached. Any fuel-to-air ratios higher than the peak are in the rich side of the intended operating range.

Figure 2:
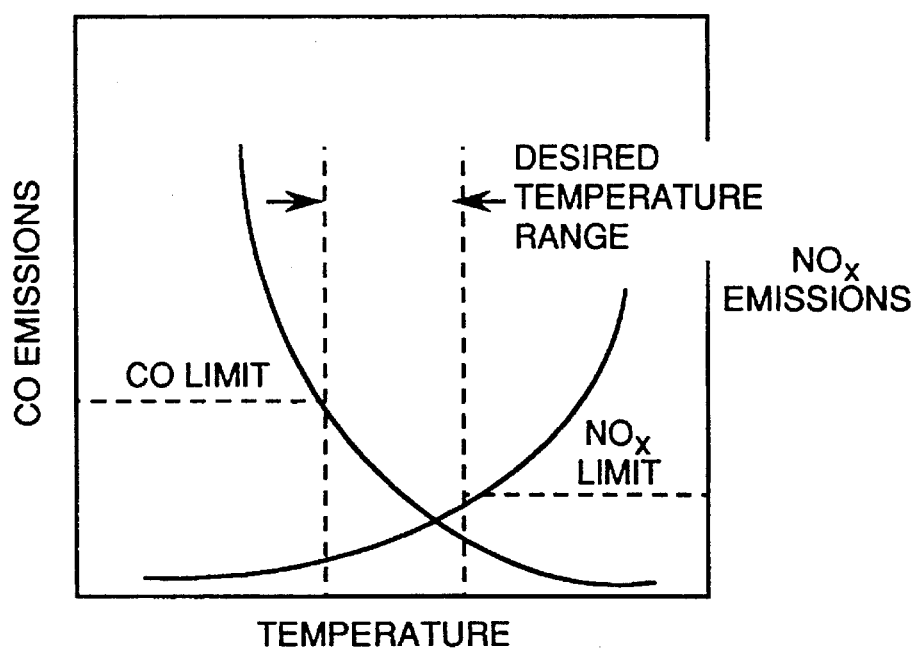
FIG. 2 is a graph illustrating relative concentrations of CO and $NO_x$ in an internal combustion engine, plotted as a function of combustion flame temperature.

FIG. 2 is a graph illustrating relative concentrations of CO and $NO_x$ in an internal combustion engine, plotted as a function of combustion flame temperature. As shown, CO concentration decreases steeply with increasing flame temperature. This concentration continues to decrease at an increasingly slower rate as the flame temperature increases further. A desirable environmental limit on such CO emissions is shown as the CO limit. The $NO_x$ concentrations remain quite low (typically less than 25 ppm) at low flame temperatures but undergo an exponential rise at increasingly higher combustion temperatures. A desirable limit on $NO_x$ emissions, is shown as the $NO_x$ limit.

To avoid a flame-out condition, while advantageously reducing both CO and $NO_x$ exhaust emissions below corresponding desired environmental limits, an internal combustion engine should be operated within a relatively small flame temperature band.

Figure 3:
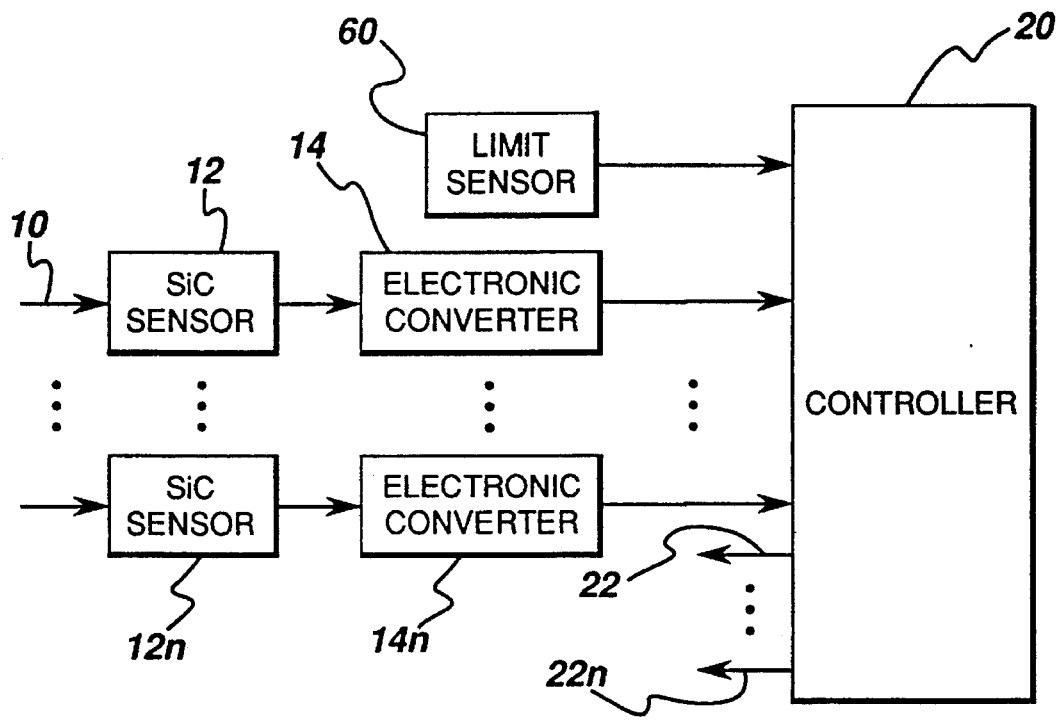
FIG. 3 is a block diagram of a flame temperature control system for an internal combustion engine.

FIG. 3 is a block diagram of a flame temperature control system for an internal combustion engine. A plurality of SiC photodiode sensors 12 to $12_n$, which are preferably sensitive to flame radiation 10 optical wavelengths of 200 nanometers to 350 nanometers, can be positioned in housings similar to spark plugs and used to sense the flame temperature at each cylinder. One example of a preferred photodiode is disclosed in Brown et al., "Silicon Carbide Photodiode with Improved Short Wavelength Response and Very Low Leakage Current," U.S. application Ser. No. 08/198,679, filed Feb. 18, 1994, which is a continuation of U.S. application Ser. No. 07/878,937, filed May 5, 1992.

Each of the sensors 12 to $12_n$ has a corresponding electronic signal converter 14 to $14_n$ that conditions the sensor output for transmission to a controller 20. The controller collects information from each of the sensor and electronic converter pairs and uses the information to provide fuel-to-air ratio control signals 22 to $22_n$ to the cylinders of the internal combustion engine in response to the conditioned signals of the plurality of signal converters such that the conditioned signal values remain within a selected operating range. The selected operating range is determined by plotting graphs such as shown in FIGS. 1 and 2 for the specific internal combustion engine and determining the relation between flame temperature values and conditioned signal values.

An examination of FIG. 1 shows that although the temperature is monotonic with the fuel-to-air ratio over a range, it is not monotonic in its entirety. The control system will therefore not function properly if it is allowed to enter the extremely rich region beyond the peak temperature. To avoid this problem, a second control mechanism, shown as limit sensor 60, is used. The limit sensor is similar to conventional fuel-to-air ratio control systems, such as those which measure oxygen input levels, except that it operates only on the too rich side of the optimum and prevents the fuel-to-air ratio from exceeding a predetermined near stoichiometric ratio. In this manner, the control system of the present invention always operates in the lean region of the fuel-to-air ratio. The control signals of the flame temperature control system of FIG. 3 act to reduce the fuel-to-air ratio to its correct range within the lean region. Fuel-to-air ratio control may be accomplished through control of fuel injection or through control of bypass air in conjunction with central fuel injection. Thus, the system is always within its correct operating range.

Figure 4:
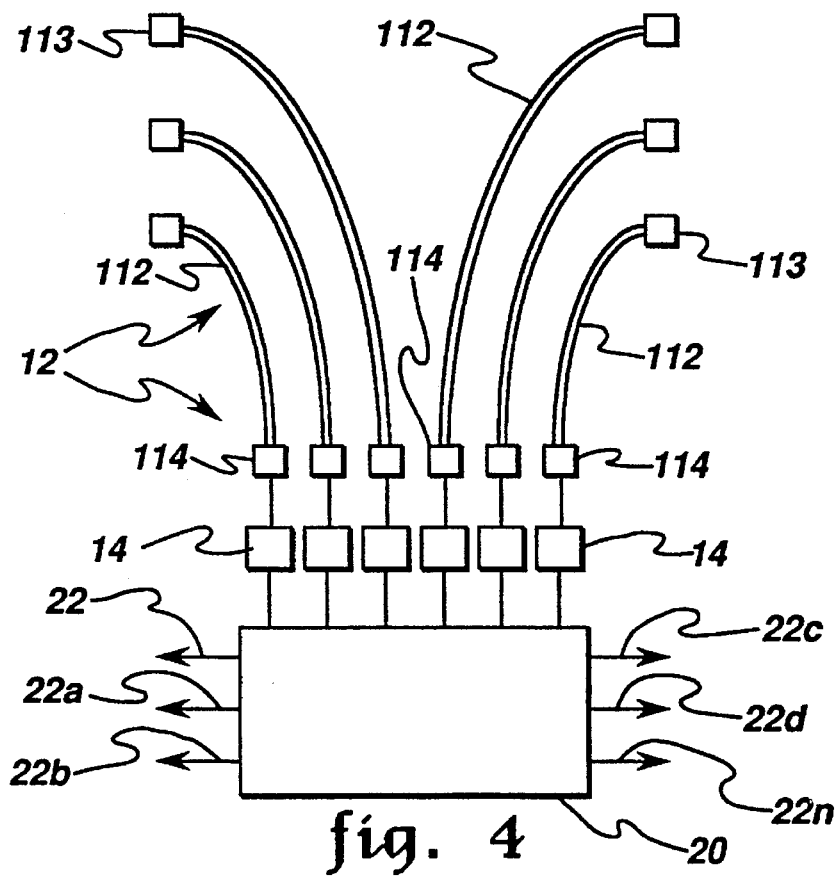
FIG. 4 is a block diagram of another embodiment of a flame temperature control system for an internal combustion engine.

Although the photodiode sensors are described in FIG. 3 as being situated close to each cylinder, the sensors can alternatively comprise optical coupling means for carrying light to a central bank of photodetectors, as shown in the embodiment of FIG. 4. In FIG. 4, engine fittings 113 for collecting flame radiation couple light to light pipes 112 which convey optical signals from each cylinder to a central bank of photodiodes 114. The light pipes may comprise a material such as quartz which can withstand a high temperature environment. Input ends for light collection of the light pipes are positioned within the cylinders so that sufficiently high temperatures are developed to remove any deposited carbon compounds on their faces. A temperature of about 300° C. is sufficient for this purpose. The photodiodes can be coupled through electrical converters to a controller as discussed with respect to FIG. 3.

Figure 5:
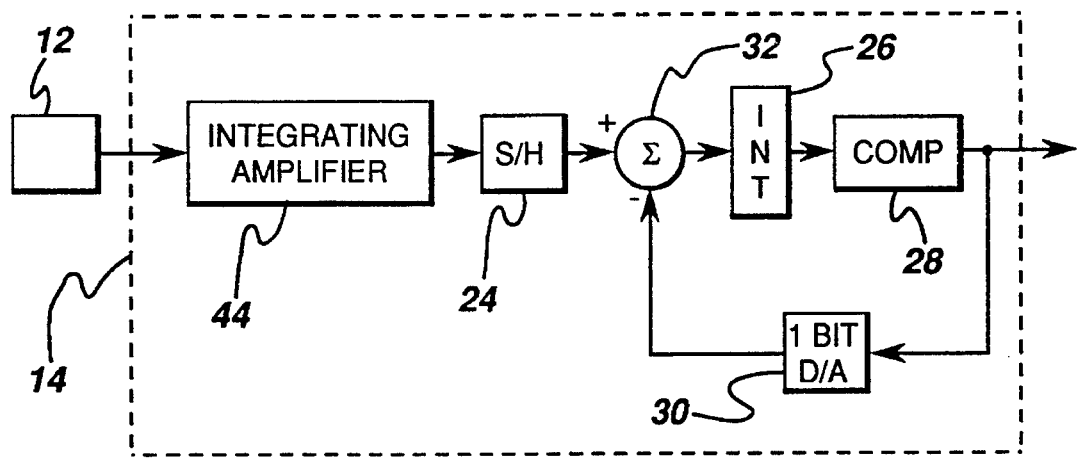
FIG. 5 is a block diagram of a signal converter for the flame temperature control system of FIG. 3.

FIG. 5 is a block diagram of an embodiment for the signal converter 14 of a respective sensor 12 for the flame temperature control system of FIG. 3. In this embodiment, the electronic converter includes an integrating amplifier 44, a sample and hold circuit, shown as S/H 24, and a delta-sigma ($\Delta$-$\Sigma$) modulator comprising a differential summation element 32, an integrator 26, a comparator 28, and a 1 bit D/A converter 30. The analog output signal from integrating amplifier 44 is sampled and held in S/H 24. Differential summation element 32 detects the difference between a sensor output signal from S/H 24 and a converted comparator output signal from the D/A converter 30. Integrator 26 receives a differential output signal from the differential summation element. Comparator 38 is provided for receiving an integrated output signal from the integrator, supplying a comparator output converted through the digital-to-analog converter to the differential summation element, and supplying the comparator output (a digital pulse) to the controller. These operations are repeated rapidly, so the signal converter generates a sequence of digital pulses that are representative of the sensor output signal.

As is apparent to those skilled in the art, elements 32, 26, 28, and 30 form a first order $\Delta$-$\Sigma$ modulator. A first order structure is shown for simplicity of illustration. When desired, higher order $\Delta$-$\Sigma$ modulator structures can be used. Preferably the converter operates at a sufficiently oversampled rate to improve resolution; many output pulses of the comparator can be sent during the interval between sample and hold functions. Delta-sigma modulators of this type typically operate with an over-sampling ratio on the order of thirty or more. The order and electrical characteristics of the $\Delta$-$\Sigma$ modulator determine the noise shape of the pulse stream output. Final digital filtering for noise shaping can be performed by the controller.

Figure 6:
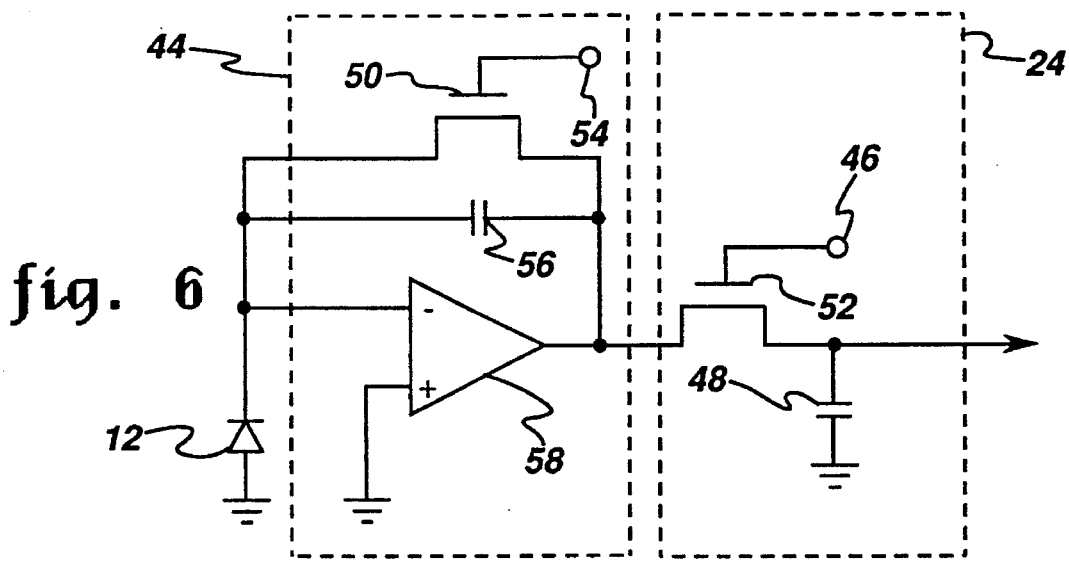
FIG. 6 is a simplified circuit diagram of an integrating amplifier and sample-and-hold circuit that can be used in the signal converter of FIG. 5.

FIG. 6 is a simplified circuit diagram of integrating amplifier 44 and sample-and-hold circuit 24 that can be used in the signal converter of FIG. 5. The integrating amplifier includes a high impedance input feedback amplifier 58. Integrating amplifier 44 senses charge delivered by the sensor and feeds back signals to cancel that charge by means of displaced charge of capacitor 56. The circuit is reset at switch 50 by an electrical signal at node 54 to initialize charge accumulation on capacitor 56. A signal on node 46 of pass switch 52 allows capacitor 48 to be charged at the end of the integration cycle. The charge on capacitor 48 is held until the next cycle of the amplifier. Although these electrical circuits can be fabricated by any appropriate conventional methods, SiC amplifiers are especially useful for high temperature applications. In this instance both the reset switch 50 and the pass switch 52 are depletion mode devices. Control pulses are required to enable operation of these devices between their pinch-off and conduction modes. One example of an SiC Amplifier is described in Brown et al., "Silicon Carbide Integrated Circuits," application Ser. No. 08/201,494, filed Feb. 24, 1994. Although the reset and sample signals have been shown as electrical signals, optical pulses conveyed to photodiode structures can alternatively be used to provide these functions.

The sample-and-hold feature of S/H 24, together with integrating amplifier 44, permits the sensing of a signal value that is representative of the peak signal of each cycle. This is especially useful because the present embodiment is an intermittent system having distinct cycles in contrast to gas turbines which are continuous burners. By sampling the optical intensities of the flames during a predetermined interval of each combustion cycle a signal representative of the peak of the flame temperature can be held. In one embodiment, the reset signal of the integrating amplifier is maintained through the initial portion of the combustion burn cycle and the output of the integrating amplifier is sampled at the predetermined interval of the time corresponding to the end of the peak of that cycle. Signals from other cylinders are appropriately sampled at times corresponding to their combustion cycles.

Figure 7:
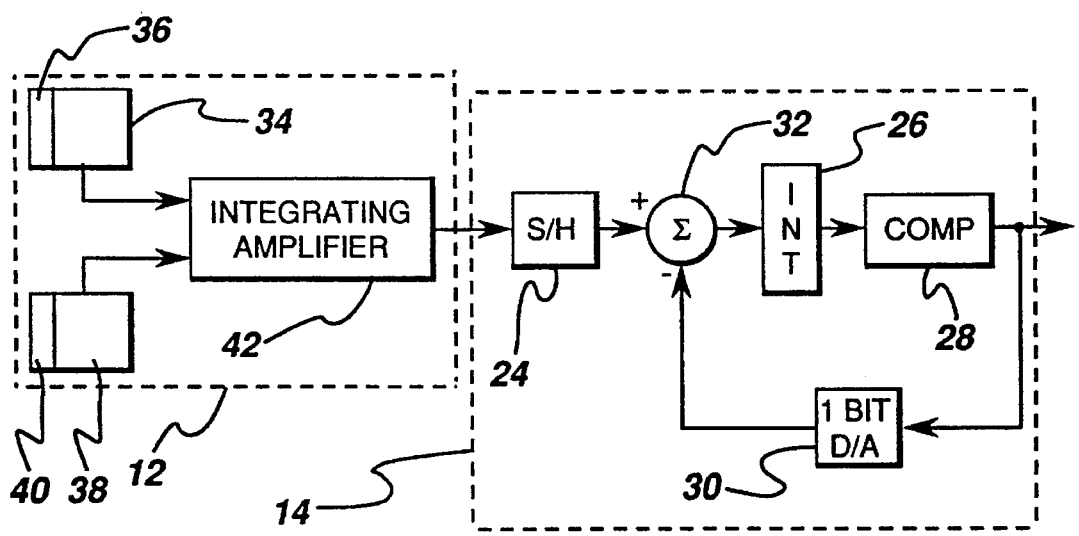
FIG. 7 is a block diagram similar to that of FIG. 5, further showing an optional sensor embodiment.

FIG. 7 is a block diagram similar to that of FIG. 5, further showing an optional embodiment of sensor 12. In this embodiment, sensor 12 includes two SiC photodiode detectors 34 and 38 with filters 36 and 40, respectively, applied to the differential inputs of a second differential summation element. In a preferred embodiment, the second differential summation element comprises an integrating amplifier 42 which is similar to that of the integrating amplifier 44 of FIG. 6. The difference signal, which is representative of the flame temperature in the internal combustion engine, is integrated and held by S/H circuit 24 for use by the remainder of the converter cycle. This differential measurement reduces common mode signals and noise. Filters 36 and 40 are interference filters filtering distinct wavelength regions and comprise materials such as quartz or sapphire substrates with dielectric optical layers thereon. These filters isolate and select the regions of the flame spectrum used by the system.

The flame temperature control system is applied to each cylinder of the internal combustion engine. This allows the engine to operate within the desired temperature range at each cylinder. When desired, controllers can be applied to only representative cylinders or to only a single cylinder. Although such applications are not preferred, they can be used when costs or other considerations are important.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An apparatus for controlling emissions in an internal combustion engine having at least one cylinder, the apparatus comprising:

at least one high temperature optical sensor, the optical sensor being adapted to sense optical flame intensity from a flame in the at least one cylinder and convert the sensed optical flame intensity to an analog signal;

an integrator for converting the analog signal to an integrated analog signal; and at least one signal converter for conditioning the integrated analog signal of the at least one optical sensor for use in an engine fuel-to-air ratio controller.

2. The apparatus of claim 1, wherein the at least one cylinder comprises a plurality of cylinders; the at least one sensor comprises a plurality of sensors, each of the optical sensors being adapted to sense optical flame intensity from a flame in a respective cylinder; and the at least one signal converter comprises a plurality of signal converters for conditioning the integrated analog signals of respective ones of the optical sensors.

3. The apparatus of claim 2, further including a controller being adapted to provide fuel control signals to the cylinders of the internal combustion engine in response to the conditioned signal values of the plurality of signal converters such that the conditioned signal values remain within a selected operating range.

4. The apparatus of claim 3, further including a limit sensor for preventing the fuel-to-air ratio of the internal combustion engine from exceeding a predetermined near stoichiometric ratio.

5. The apparatus of claim 3, wherein each of the plurality of optical sensors comprises a silicon carbide photodiode sensor.

6. The apparatus of claim 5, wherein each of the plurality of photodiode sensors includes an optical coupler for conveying an optical flame intensity signal to a respective silicon carbide photodiode.

7. The apparatus of claim 6, wherein each optical coupler comprises a light pipe.

8. The apparatus of claim 5, wherein each of the plurality of signal converters includes a feedback loop for converting the integrated analog signals of a respective one of the plurality of photodiode sensors to digital pulse signals.

9. The apparatus of claim 8, wherein each of the signal converters comprises a delta-sigma modulator.

10. The apparatus of claim 9, wherein each of the modulators includes:

a digital-to-analog converter;

a differential summation element for detecting the difference between a sensor output signal and a converted comparator output signal from the digital-to-analog converter;

an additional integrator for receiving a differential output signal from the differential summation element; and a comparator for receiving an integrated output signal from the additional integrator, supplying a comparator output signal to the digital-to-analog converter, and supplying a comparator output signal to the controller.

11. The apparatus of claim 9, further including a plurality of sample-and-hold circuits, each sample-and-hold circuit coupled between a respective sensor for measuring peak integrated analog signal values of respective sensor output signals and for providing the peak integrated analog signal values to a respective modulator.

12. The apparatus of claim 11, wherein each integrator comprises an integrating amplifier.

13. The apparatus of claim 5, wherein each of the plurality of photodiode sensors comprises a single respective silicon carbide photodiode.

14. The apparatus of claim 5, wherein each of the plurality of photodiode sensors comprises:

two respective silicon carbide photodiodes;

a wavelength filter situated over a portion of one of the two respective photodiodes; and wherein the integrator comprises an integrating amplifier adapted to detect the difference between output signals of the two respective photodiodes.

15. The apparatus of claim 14, further including a second wavelength filter situated over a portion of the other of the two respective photodiodes, the second wavelength filter passing a different range of wavelengths than the wavelength filter.

16. The apparatus of claim 5, wherein each of the plurality of photodiode sensors comprises two respective silicon carbide photodiodes, a wavelength filter situated over a portion of one of the two respective photodiodes, and wherein the integrator comprises an integrating amplifier for receiving the output signals of the two respective photodiodes; and wherein each of the signal converters comprises a sample-and-hold circuit for measuring peak analog signal values from the integrating amplifier, a digital-to-analog converter, a differential summation element for detecting the difference between a peak integrated analog signal value from the sample-and-hold circuit and a converted comparator output signal value from the digital-to-analog converter, an additional integrator for receiving a differential output signal from the differential summation element and a comparator for receiving an integrated output signal from the additional integrator, supplying a comparator output signal to the digital-to-analog converter, and supplying a comparator output signal to the controller.

17. The apparatus of claim 5, wherein each silicon carbide photodiode sensor is adapted to sense optical flame intensity of flame radiation optical wavelengths ranging from 200 nanometers to 350 nanometers.

18. A method for controlling emissions in an internal combustion engine having a plurality of cylinders, the method comprising:

sensing optical intensities of flames in selected ones of the plurality of cylinders;

converting each of the sensed optical intensities to a respective analog signal;

converting each of the analog signals to a respective integrated analog signal;

converting each of the integrated analog signals to a respective plurality of digital pulses; and providing fuel-to-air ratio control signals to the respective cylinders of the internal combustion engine in response to the digital pulses.

19. The method of claim 18, wherein the step of sensing the optical intensities includes sampling the optical intensities of the flames during a predetermined interval of each of the combustion cycles.

20. The method of claim 18, wherein the step of sensing optical intensities includes positioning a plurality of high temperature optical sensors near respective ones of the cylinders.

21. The method of claim 18, wherein the step of positioning a plurality of optical sensors near respective ones of the cylinders comprises positioning a plurality of silicon carbide photodiode sensors near respective ones of the cylinders.

22. The method of claim 21, wherein the step of converting each of the integrated analog signals to a respective plurality of digital pulses includes applying a delta-sigma modulator to each integrated analog signal.

23. The method of claim 22, further including sampling each of the integrated analog signals during a predetermined period and holding the peak values of the integrated analog signals prior to converting each of the integrated analog signals to digital pulses.

24. The method of claim 22, wherein the step of positioning a plurality of silicon carbide photodiode sensors near respective ones of the cylinders comprises situating two respective silicon carbide photodiodes near each respective cylinder and providing a wavelength filter situated over a portion of one of the two respective photodiodes; and wherein the step of converting the sensed optical intensities of each respective cylinder to a respective integrated analog signal includes determining the difference between output signals of the two respective photodiodes.

25. The method of claim 21, wherein the step of positioning a plurality of silicon carbide photodiode sensors near respective ones of the cylinders comprises situating two respective silicon carbide photodiodes near each respective cylinder and providing a wavelength filter situated over a portion of one of the two respective photodiodes;

wherein the step of converting each of the analog signals to a respective integrated analog signal further includes measuring a peak difference signal of the integrated analog signals of each pair of two respective diodes; and wherein the step of converting the integrated analog signals to respective digital pulses includes conditioning the peak difference signal values with respective delta-sigma modulators.

26. The method of claim 21, wherein the step of sensing optical intensities of flames in selected ones of the plurality of cylinders comprises sensing optical intensities of flame radiation optical wavelengths ranging from 200 nanometers to 350 nanometers.

* * * * *